United States Patent
Kinoshita et al.

(10) Patent No.: US 12,157,070 B2
(45) Date of Patent: *Dec. 3, 2024

(54) SEPARATION INSTRUMENT, SEPARATION DEVICE, SEPARATION SYSTEM, AND SEPARATION METHOD

(71) Applicant: BIOCHROMATO, INC., Kanagawa (JP)

(72) Inventors: Kazumasa Kinoshita, Kanagawa (JP); Takao Nishiguchi, Kanagawa (JP); Tomoaki Endo, Kanagawa (JP)

(73) Assignee: BIOCHROMATO, INC., Kanagawa (JP)

( * ) Notice: Subject to any disclaimer, the term of this patent is extended or adjusted under 35 U.S.C. 154(b) by 96 days.

This patent is subject to a terminal disclaimer.

(21) Appl. No.: 18/000,003

(22) PCT Filed: Oct. 26, 2021

(86) PCT No.: PCT/JP2021/039565
§ 371 (c)(1),
(2) Date: Nov. 28, 2022

(87) PCT Pub. No.: WO2022/092123
PCT Pub. Date: May 5, 2022

(65) Prior Publication Data
US 2023/0201739 A1    Jun. 29, 2023

(30) Foreign Application Priority Data
Oct. 26, 2020  (JP) ................. 2020-178774

(51) Int. Cl.
*B01L 3/00* (2006.01)
*B01D 1/00* (2006.01)
*B01D 1/14* (2006.01)

(52) U.S. Cl.
CPC ............. *B01D 1/14* (2013.01); *B01D 1/0041* (2013.01); *B01L 3/50825* (2013.01); *B01L 3/56* (2013.01)

(58) Field of Classification Search
CPC ..................... B01L 3/50825; B01L 3/56–569
See application file for complete search history.

(56) References Cited

U.S. PATENT DOCUMENTS

| | | | |
|---|---|---|---|
| 4,600,473 A | 7/1986 | Friswell | |
| 2010/0012278 A1 | 1/2010 | Ohnuki et al. | |
| 2023/0347336 A1* | 11/2023 | Mawatari | ................ B01L 3/502 |

FOREIGN PATENT DOCUMENTS

| | | |
|---|---|---|
| EP | 2119497 | 11/2009 |
| JP | 863-502646 | 10/1988 |

(Continued)

OTHER PUBLICATIONS

Extended European Search Report mailed on Mar. 2, 2023 with respect to the corresponding European patent application No. 21886241.5.

(Continued)

*Primary Examiner* — Jonathan Luke Pilcher
(74) *Attorney, Agent, or Firm* — IPUSA, PLLC (57) ABSTRACT

In a separation instrument configured to separate a gaseous substance from a solution contained in a container, the separation instrument includes: a first end; a second end; and a side surface provided between the first end and the second end, wherein a plurality of gas introduction grooves configured to swirl a gas and introduce the gas into the container are formed on the side surface between the first end and the second end, and a discharge hole configured to discharge the gaseous substance separated from the solution together with the gas is formed between a center portion of the second end and a center portion of the first end.

4 Claims, 11 Drawing Sheets

(56) References Cited

FOREIGN PATENT DOCUMENTS

| | | |
|---|---|---|
| JP | 2014-104412 | 6/2014 |
| JP | 2014-222148 | 11/2014 |
| JP | 2018-158292 | 10/2018 |
| WO | 2008/078765 | 7/2008 |
| WO | 2013/035755 | 3/2013 |

OTHER PUBLICATIONS

International Search Report mailed on Jan. 11, 2022 with respect to PCT/JP2021/039565.

* cited by examiner

| | NUMBER OF GROOVE(S) IN SEPARATION INSTRUMENT | n (sec) | | | | | AVERAGE OF 5 TIMES | SCATTERING | REMARKS |
|---|---|---|---|---|---|---|---|---|---|
| | | 1 | 2 | 3 | 4 | 5 | | | |
| EXAMPLE 1 | 2 | 720 | 810 | 720 | 810 | 800 | 772 | ○ GOOD | |
| EXAMPLE 2 | 3 | 800 | 830 | 820 | 840 | 855 | 829 | ◎ EXCELLENT | |
| EXAMPLE 3 | 4 | 700 | 770 | 850 | 860 | 840 | 804 | ○ GOOD | |
| EXAMPLE 4 | 5 | 780 | 780 | 900 | 870 | 910 | 848 | ○ GOOD | |
| EXAMPLE 5 | 6 | 720 | 720 | 720 | 870 | 870 | 780 | ◎ EXCELLENT | |
| EXAMPLE 6 | 7 | 810 | 800 | 940 | 930 | 880 | 872 | ◎ EXCELLENT | |
| EXAMPLE 7 | 8 | 760 | 730 | 770 | 830 | 840 | 786 | ◎ EXCELLENT | |
| EXAMPLE 8 | 9 | 720 | 680 | 720 | 815 | 820 | 751 | ◎ EXCELLENT | |
| EXAMPLE 9 | 10 | 790 | 780 | 840 | 890 | 890 | 838 | ○ GOOD | |
| COMPARATIVE EXAMPLE 1 | 1 | 340 | 410 | — | — | — | — | × NOT GOOD | |

SEPARATION INSTRUMENT, SEPARATION DEVICE, SEPARATION SYSTEM, AND SEPARATION METHOD

TECHNICAL FIELD

The present invention relates to a separation instrument, a separation device, a separation system, and a separation method.

BACKGROUND ART

PTL 1 discloses a stopper for closing an opening of a container that contains a solution containing a volatile substance. The stopper includes a through-pore for exhausting gas, a gas inlet port, a gas outlet port, and a spiral groove connecting the gas inlet port to the gas outlet port, the spiral groove being formed at the side surface of the stopper. According to the stopper of PTL 1, external gas is introduced from the gas inlet port into the space between an inner peripheral surface of the container and the groove, and blown into the container through the gas outlet port. When the gas rotates spirally along the inner peripheral surface of the container, the solution is swirled up and the volatile substance contained in the solution is vaporized and separated.

CITATION LIST

Patent Literature

[PTL 1]
Japanese Patent No. 4763805

SUMMARY OF INVENTION

Technical Problem

However, because the stopper disclosed in PTL 1 has a configuration in which one groove for spirally rotating the gas is formed on the stopper attached to the opening of the container containing the solution, it is difficult for the gas reaching the liquid surface to flow uniformly. This may increase the time needed to separate the gaseous substance in the solution.

The present disclosure has been made in view of the foregoing, and an object thereof is to obtain a separation instrument that requires less time to separate a gaseous substance dissolved in a solution.

Solution to Problem

In order to solve the above problem, according to the present disclosure, a separation instrument, configured to separate a gaseous substance from a solution contained in a container, includes: a first end; a second end; and a side surface provided between the first end and the second end, wherein a plurality of gas introduction grooves configured to swirl a gas and introduce the gas into the container are formed on the side surface between the first end and the second end, and a discharge hole configured to discharge the gaseous substance separated from the solution together with the gas is formed between a center portion of the second end and a center portion of the first end.

Advantageous Effects of Invention

According to the present disclosure, the time needed to separate a gaseous substance dissolved in a solution can be reduced.

DESCRIPTION OF EMBODIMENTS

Hereinafter, embodiments for carrying out the present disclosure will be described with reference to the drawings. The present invention is not limited to the particulars of the described embodiments. In the description of the figures below, the same or similar parts are given the same or similar reference numerals. The following embodiments exemplify apparatuses and methods that embody the technical idea of the present disclosure. The technical idea of the present disclosure is not limited to the specifics of the structure, arrangement, and the like, of the components as described below. Various modifications can be made to the technical idea of the present disclosure within the technical scope defined by the claims.

Figure 1:
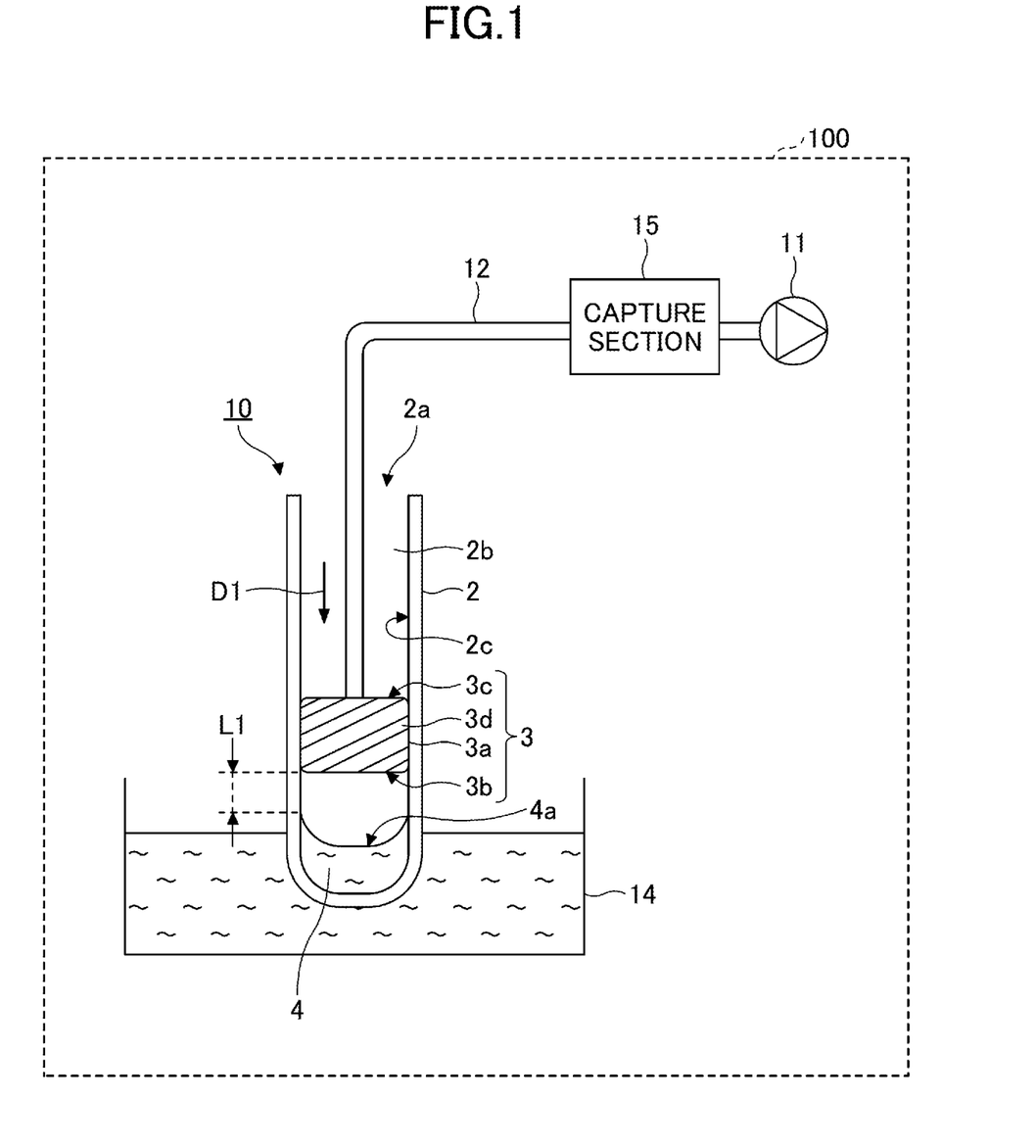
FIG. 1 is a diagram illustrating the overall configuration of a separation device 10 including a separation instrument 3 and a separation system 100 according to the present embodiment.

FIG. 1 is a diagram illustrating the overall configuration of a separation device 10 including a separation instrument 3 and a separation system 100 according to the present embodiment. The separation system 100 is a device for separating a gaseous substance from a solution 4 in which the gaseous substance is dissolved and capturing the separated gaseous substance. Examples of the gaseous substances include volatile substances such as methanol, ethanol, acetonitrile, water, and dimethyl sulfoxide (DMSO), carbonic acid, oxygen, and the like.

The separation system 100 includes a depressurization section 11 for depressurizing the inside of a container 2, a capture section 15 for capturing the gaseous substance, a pipe 12, and the separation device 10. The depressurization section 11 is, for example, an exhaust air pump. The pipe 12 is connected to the depressurization section 11. The capture section 15 is provided in the middle of the pipe 12. The capture section 15 is not a required element, and may be omitted when, for example, the separated gaseous substance may be released directly into the atmosphere without any problem. The end of the pipe 12 is inserted into the separation instrument 3. A valve (not illustrated) may be provided at an appropriate location on the pipe 12. The amount of drawn gas may be adjusted by adjusting the opening of the valve.

The separation device 10 includes the container 2 and the separation instrument 3. The container 2 is, for example, a centrifuge tube made of glass, plastic, or the like, or a similar container. In the present embodiment, a general-purpose product (for example, a Falcon tube) having a constant inner diameter from the opening 2a of the container 2 to the vicinity of the bottom is used as the container 2. The shape of the container is not limited to the one with a constant inner diameter. In the case where the container has a tapered shape that narrows toward the interior of the container from the opening, there is no problem when a separation instrument having a shape that can be brought into close contact with the inner diameter of the tapered shape is used. "That can be brought into close contact" means having airtightness to the extent that gas does not substantially flow in and out from the side surface of the separation instrument other than through gas introduction grooves formed in the side surface of the separation instrument. The gas introduction grooves will be described later.

The solution 4 is contained in the container 2. The container 2 is supported by a support member (not illustrated) such that the bottom of the container 2 is immersed in a tank 14 of a water bath, for example. By heating the water in the tank 14, vaporization and separation of the gaseous substance such as the volatile substance from the solution 4 are promoted. In the example of FIG. 1, the separation instrument 3 is immersed in the tank 14, but instead of immersing the separation instrument 3 in the tank 14, a bead bath in which aluminum beads are spread may be used, or the separation instrument 3 may be heated such as by applying hot air to the container 2. Heating may be unnecessary depending on the type of the solution 4 containing the gaseous substance, the outside temperature, and the like.

The separation instrument 3 is inserted into an inner space 2b of the container 2. The separation instrument 3 is a columnar member that separates and discharges the dissolved gaseous substance from the solution 4 contained in the container 2. The separation instrument 3 is inserted from the opening 2a of the container 2 toward the bottom of the container 2 in an insertion direction D1, and is provided near the surface 4a at a predetermined distance L1 from the surface 4a of the solution 4 in the container 2. The predetermined distance L1 corresponds to the distance from the highest point of the surface 4a of the solution 4 due to the surface tension on the inner peripheral surface of the container 2 to a second end 3b of the separation instrument 3. For example, the predetermined distance L1 is set to a value at which the separation instrument 3 is close to the surface 4a of the solution 4, and also, the predetermined distance L1 is set such that, when the depressurization section 11 operates and the solution 4 is swirled up by the gas blown into the container 2 through the separation instrument 3, the swirled solution 4 is not sucked into the pipe 12.

For example, by reducing the discharge amount of the depressurization section 11, the flow of the gas blown through the side surface 3a of the separation instrument 3 is decreased. Therefore, the liquid surface is not heavily swirled up, and the length of L1 can be reduced. However, when the exhaust amount (gas blowing amount) is too small, the stirring action of the solution will hardly work and the solution will be in a state close to standing still, so it will take a long time to separate the gaseous substance.

Conversely, when the exhaust amount by the depressurization section 11 is too large, the gas is blown at high speed from the side surface 3a of the separation instrument 3, and the liquid surface is heavily stirred and scattered. Some of the scattered solution not only adheres to the inner wall (the inner peripheral surface 2c) of the container 2, but is also drawn at high speed through the discharge hole. As a result, even when the length of L1 is increased, the gaseous substance is not separated so much, and the solution is easily sucked into the pipe 12 as is, which is not preferable. In addition, as will be described later, in a case where the gas flow blown from the side surface 3a of the separation instrument 3 is uneven, even when the length of L1 is increased, the gaseous substance is not separated so much, and the solution is easily sucked into the pipe 12 as is, which is not preferable. Accordingly, a configuration in which the separation instrument is arranged near the liquid surface (the surface 4a of the solution 4) is preferable.

Figure 2:
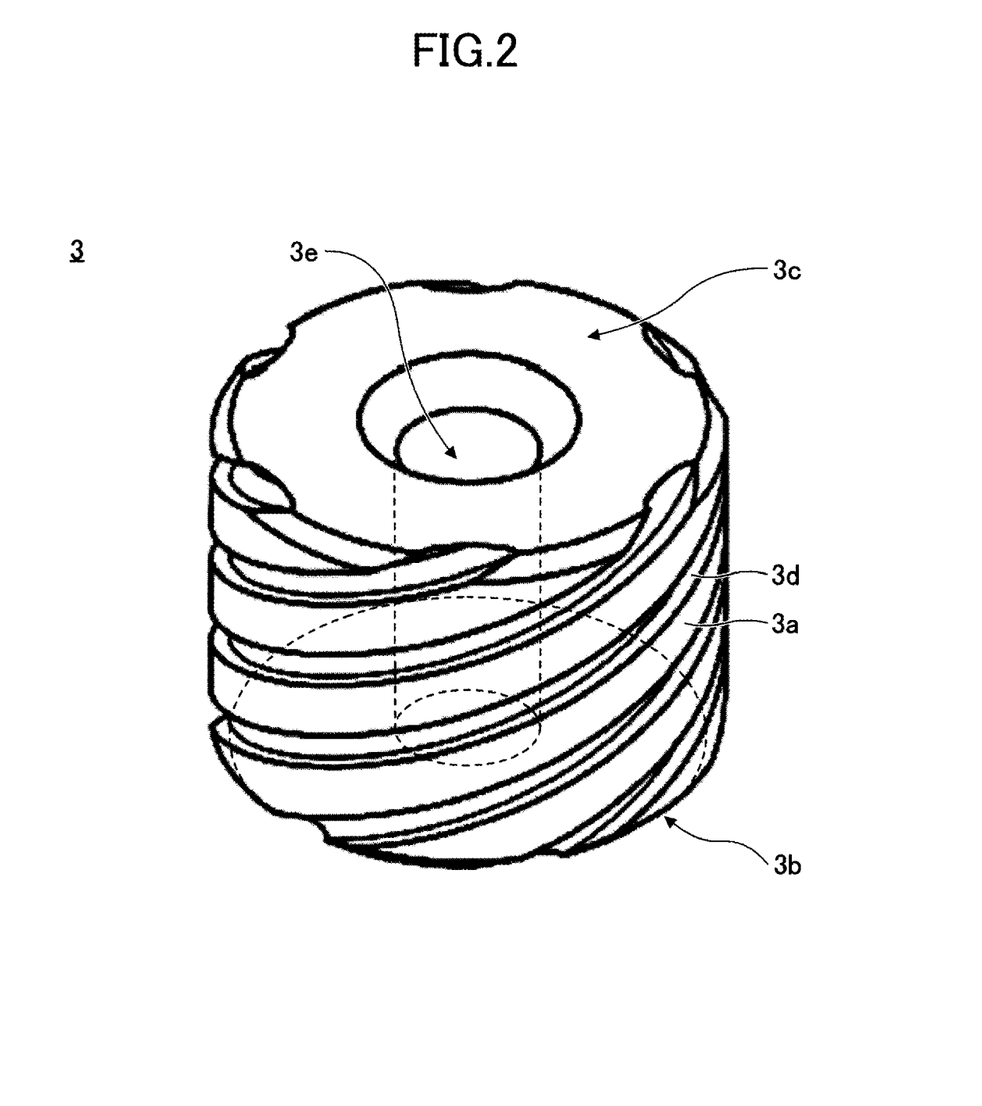
FIG. 2 is a perspective view of the separation instrument 3.
Figure 3:
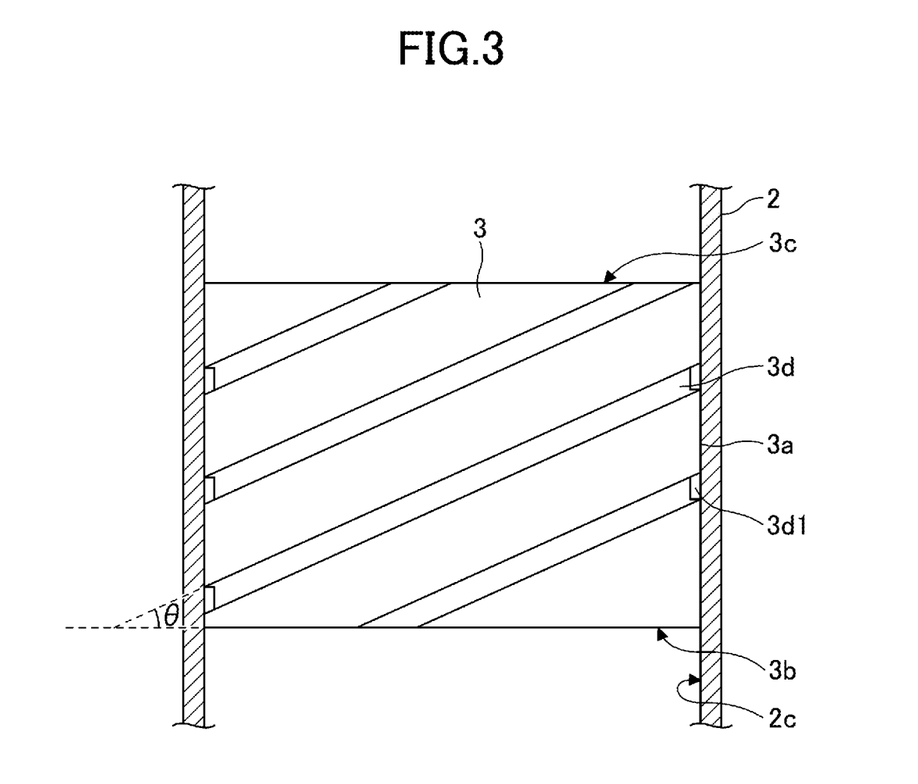
FIG. 3 is a side view of the separation instrument 3.

Next, a configuration example of the separation instrument 3 will be described with reference to FIGS. 2 and 3. FIG. 2 is a perspective view of the separation instrument 3. FIG. 3 is a side view of the separation instrument 3.

The separation instrument 3 includes a first end 3c located on the side opposite to the solution 4 side of the separation instrument 3, the second end 3b located on the solution side of the separation instrument 3, the side surface 3a located between the first end 3c and the second end 3b, grooves 3d, and a through hole 3e.

The material of the separation instrument 3 is not particularly limited, but is preferably a material that is stable even in contact with a solution. For example, fluorinated resins such as fluorinated rubber, polytetrafluoroethylene (PTFE), and the like, are preferable. Examples of the material other than fluorinated materials include, depending on the type of solution, a general purpose rubber such as silicone rubber, polyisobutylene rubber, acrylic rubber, styrene-butadiene rubber, butadiene rubber, isoprene rubber, chloroprene rubber, and the like, or, a thermoplastic elastomer such as polyethylene elastomer, polyisobutylene elastomer, and the like.

The grooves 3d are sloped grooves for introducing gases, which extends from the first end 3c to the second end 3b. The separation instrument 3 illustrated in FIG. 2 is formed with six grooves 3d. The grooves 3d are formed on the side surface 3a of the separation instrument 3 and tilt at a predetermined angle with respect to the second end 3b. The tilt angle θ of the grooves 3d is preferably 10° to 45°, and more preferably 15° to 25° from the viewpoint of increasing the separation efficiency by the grooves 3d while increasing the flow rate of the gas introduced into the container 2. The grooves are one example of gas introduction grooves.

The gas introduced into the grooves 3d is preferably air. Depending on the type of the gaseous substance, it may be necessary to separate the gaseous substance from the solution under an inert gas (for example, nitrogen or argon gas). In this case, at least, the entire container 2 into which the separation instrument 3 is inserted may be placed under an inert gas atmosphere. The grooves 3d extends from the first end 3c toward the second end 3b in a clockwise direction when viewed from the upper side of the separation instrument 3, but may extend in a counterclockwise direction.

The number of the grooves 3d is preferably plural. The flow of the gas blown from a single groove tends to be uneven, and depending on the gas flow rate, the liquid surface may not be stable. The number of the grooves is preferably 2 to 10. In the case of 2 grooves, the interval thereof is preferably 180°, and in the case of 3 grooves, the interval thereof is preferably 120°. The gas grooves are preferably arranged at equal intervals in any of the cases of 4, 5, . . . , and 10 grooves.

The depth and width of the grooves 3d are suitably set depending on the dimensions of the separation instrument 3. Preferably, the cross-sectional area of the grooves 3d is 0.4 to 10% of the cross-sectional area of the separation instrument 3, and more preferably 1.6 to 3.5% of the cross-sectional area of the separation instrument 3. When the cross-sectional area of the grooves 3d is less than 0.4% of the cross-sectional area of the separation instrument 3, the solution 4 blown up by the gas blown in from the grooves 3d may reach the top of the container 2 and enter the pump. In contrast, when the cross-sectional area of the grooves 3d exceeds 10% of the cross-sectional area of the separation instrument 3, the gas blown from the grooves 3d may hit only the upper portion of the solution 4, and only the upper portion of the solution 4 is stirred, resulting in an insufficient effect to promote vaporization of the gaseous substance.

It is preferable that the plurality of grooves 3d have the same cross-sectional area. When different cross-sectional areas are used, if the number of the grooves is even, it is preferable to alternately combine grooves with a large cross-sectional area and grooves with a small cross-sectional area. For example, when there are six grooves, stable separation can be achieved by setting three grooves to have a larger cross-sectional area and the remaining three grooves to have a smaller cross-sectional area.

The grooves 3d are preferably formed as a spiral on the side surface 3a of the separation instrument 3 from the first end 3c toward the second end 3b of the separation instrument 3.

The side surface 3a contacts the inner peripheral surface 2c of the container 2 illustrated in FIG. 1 in a region between the first end 3c to the second end 3b. That is, the separation instrument 3 is formed so that the entire side surface 3a except for the grooves 3d is in contact with the inner peripheral surface 2c of the container 2. Thus, a space 3d1 (see FIG. 3) is formed between the grooves 3d and the inner peripheral surface 2c of the container 2. The space 3d1 communicates from the first end 3c to the second end 3b of the separation instrument 3, and serves as a path through which the gas is introduced. Accordingly, the gas introduced from the first end 3c to the grooves 3d of the separation instrument 3 is led to the second end 3b of the separation instrument 3, without being diffused to portions other than the grooves 3d (between the side surface 3a of the separation instrument 3 and the inner peripheral surface 2c of the container 2), and sprayed onto the solution 4.

The through hole 3e is a discharge hole for discharging the gaseous substance separated from the solution 4 together with the gas introduced into the container 2 through the grooves 3d. The through hole 3e is formed between a center portion of the second end 3b and a center portion of the first end 3c.

Preferably, the cross-sectional area of the through hole 3e is the same as or larger than the total cross-sectional area of the grooves.

When the gas is blown from the side surface 3a of the separation instrument 3 to the solution surface (the surface 4a of the solution 4) as a swirling flow, the swirling flow of the gas induces rotational movement of the entire solution. As a result of the rotational movement of the solution, a centrifugal force acts on the solution on the side of the inner peripheral surface C2 of the container 2, which acts to raise the liquid level. However, the swirling flow of the gas exerts a downward force, and the gas is drawn from the through hole 3e formed in the center portion of the separation instrument 3, thereby reducing the air pressure near the center portion of the liquid surface. Further, by arranging the separation instrument 3 near the liquid surface, it is possible to prevent the liquid surface from scattering. Therefore, even when a certain amount of gas is blown in, due to the balance of these factors, the liquid surface does not fluctuate significantly. As a result, it is possible to stably maintain the state in which the lower end of the separation instrument 3 is close to the liquid surface.

Figure 4:
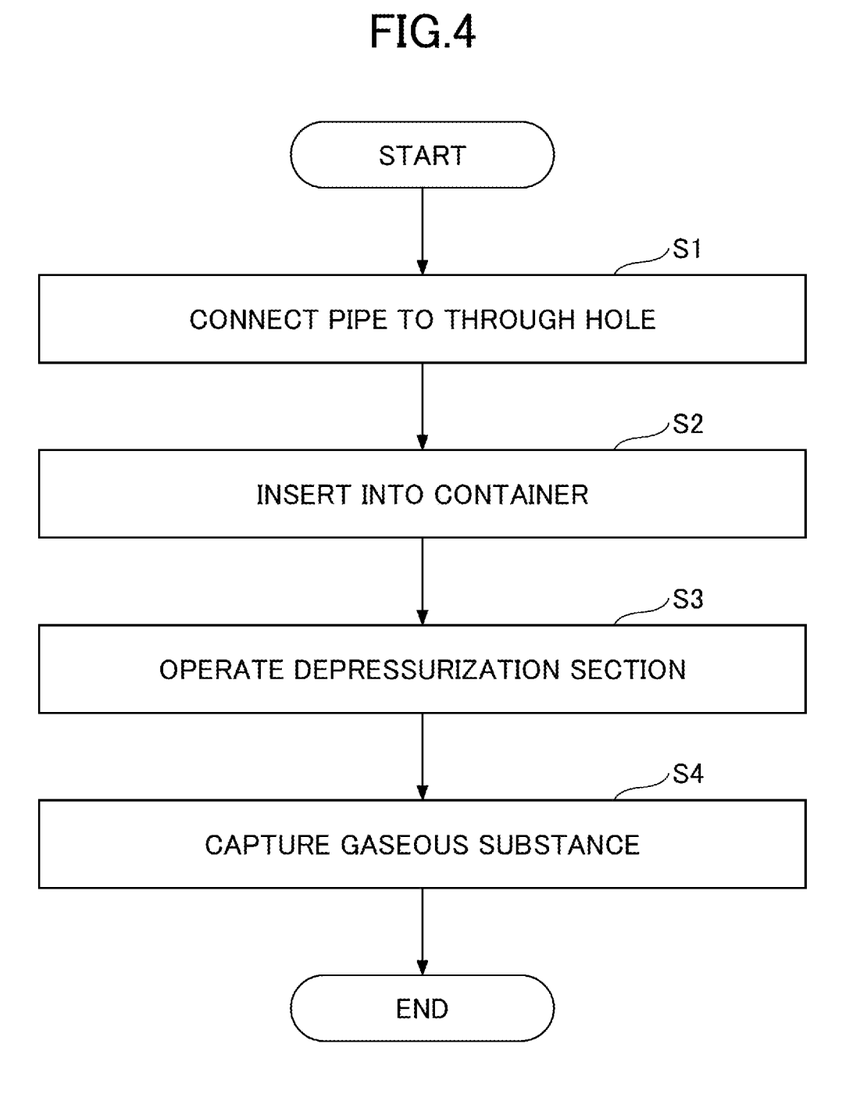
FIG. 4 is a flow chart illustrating the operation of the separation system 100.
Figure 5:
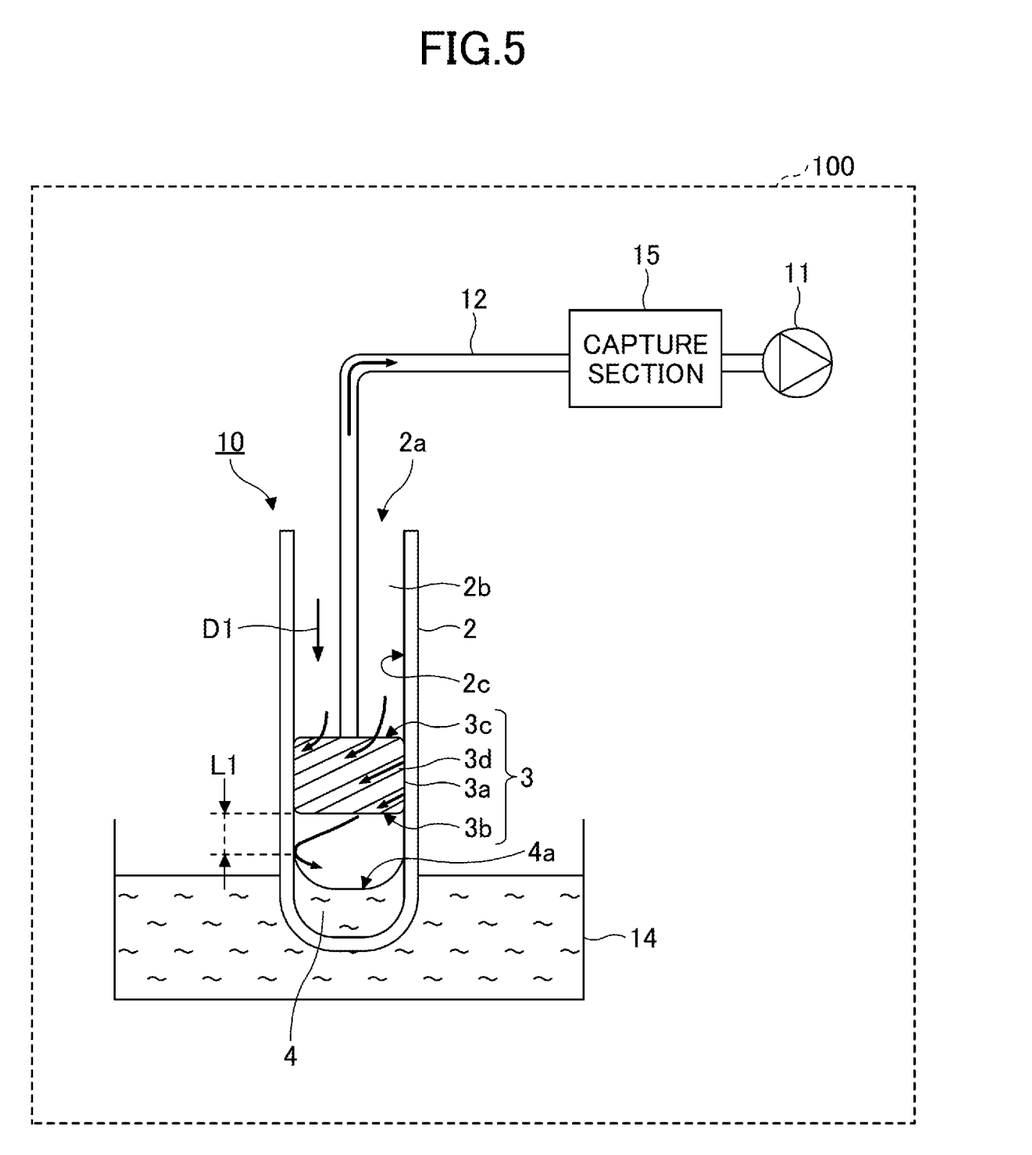
FIG. 5 is a diagram illustrating a state of a gas flowing through grooves 3d and the like of the separation instrument 3 during operation of the separation system 100.

Next, the operation of the separation system 100 will be described with reference to FIGS. 4 and 5. FIG. 4 is a flow chart illustrating operation of the separation system 100. FIG. 5 is a diagram illustrating a state of a gas flowing through the grooves 3d of the separation instrument 3 and the like when the separation system 100 is in operation.

With the pipe 12, which extends from the capture section 15, inserted into the through hole 3e of the separation instrument 3 (step S1), the separation instrument 3 is inserted into the container 2 (step S2).

As illustrated in FIG. 1, the separation instrument 3 is disposed so as to be close to the solution 4, and the depressurizing section 11 is operated (step S3). As a result, the pressure inside the container 2 is reduced, and the gas on the first end 3c side of the separation instrument 3 is drawn into the grooves 3d and blown into the container 2 at high speed through the grooves 3d.

Insertion of the separation instrument may be performed as follows. First, the separation instrument is positioned away from the solution surface and the depressurization section is operated. Then the separation instrument is gradually brought closer to the solution surface while the operation of the depressurization section is kept constant, and the separation instrument is held at such a distance to the solution surface that the liquid does not get caught in the through hole. Alternatively, the separation device may be positioned near the solution surface while the operation of the depressurization section is kept low. Then the exhaust amount of the depressurization section is gradually increased, and the operation of the depressurization section is made constant with the exhaust amount of the depressurization section to such an extent that the liquid does not get caught in the through hole.

When the same amount of the same solution is taken into the container, the gaseous substance can be stably separated by reproducing the position of the separation instrument in proximity to the exhaust amount of the above-described constant exhaust amount of the depressurization section. In addition, it is possible to separate stable gaseous substances by reproducing the position of the separation instrument close to the liquid surface with the above-described constant exhaust amount of the depressurization section.

The gas blown in at high speed reaches the solution 4, for example, by spiraling along the inner peripheral surface 2c of the container 2. As a result, the solution 4 is swirled up by the airflow and stirred, thereby promoting the vaporization of the gaseous substance. The vaporized gaseous substance is captured by the capture section 15 through the pipe 12 (step S4).

Figure 6:
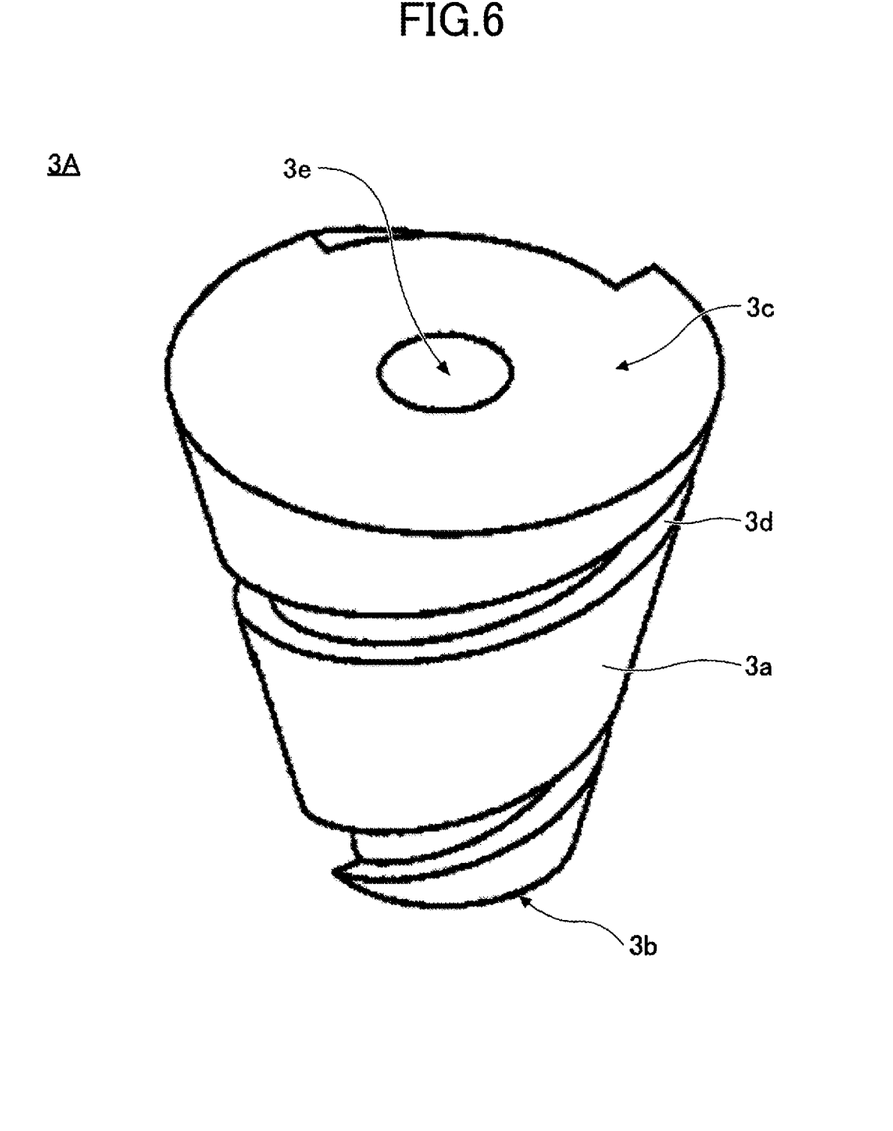
FIG. 6 is a perspective view of a separation instrument 3A according to Comparative Example 1.
Figure 7:
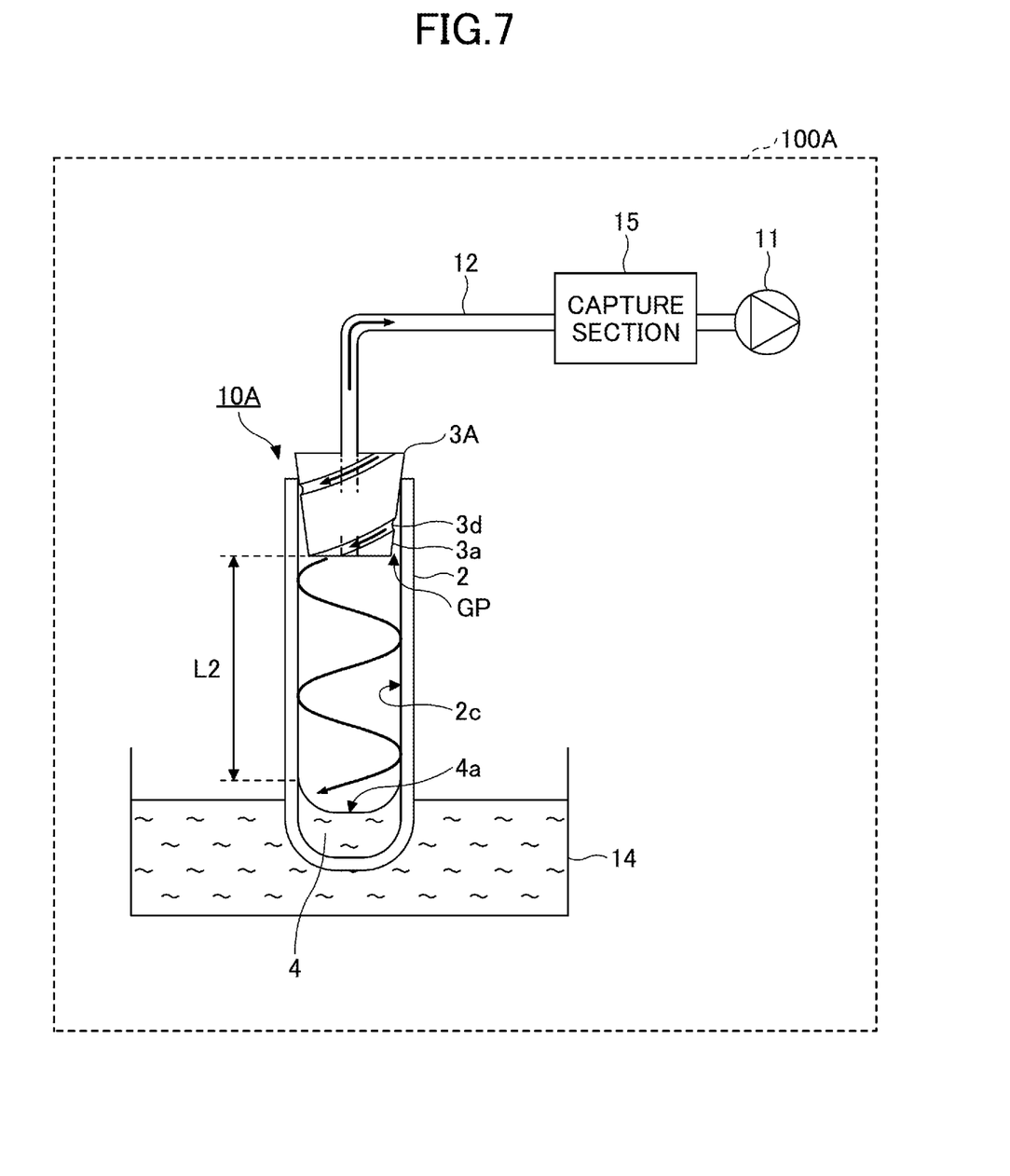
FIG. 7 is a diagram illustrating the configuration example of a separation system 100A using the separation instrument 3A.

Next, Comparative Example 1 of the separation instrument 3 according to the present embodiment will be described with reference to FIGS. 6 and 7. FIG. 6 is a perspective view of a separation instrument 3A according to Comparative Example 1, which is a prior art. FIG. 7 is a diagram illustrating a configuration example of a separation system 100A using the separation instrument 3A illustrated in FIG. 6.

The separation instrument 3A is formed into a truncated cone shape so as to block the opening 2a of the container 2. The grooves 3d are formed in the side surface 3a of the separation instrument 3A.

When the separation instrument 3A having such a shape is attached to the opening 2a of the container 2, because the inner diameter of the container 2 is constant from the opening 2a to the vicinity of the bottom, a gap GP is formed between the side surface 3a of the separation instrument 3A and the inner peripheral surface 2c of the container 2. In addition, because the separation instrument 3A is provided near the opening 2a of the container 2, the distance L2 from the second end 3b of the separation instrument 3A to the surface 4a of the solution 4 is increased.

The air flow when the depressurization section 11 is operated will be described with reference to FIG. 7. When the depressurization section 11 is operated while the separation instrument 3A is attached to the container 2, the inside of the container 2 is depressurized and the gas at the first end 3c side of the separation instrument 3A is taken into the grooves 3d. At this time, a part of the gas passing through the grooves 3d leaks out from the gap GP, and furthermore, because the distance L2 is long, so that the gas momentum is greatly reduced before reaching the solution 4. Therefore, it may take a long time to vaporize the gaseous substance dissolved in the solution 4.

In order to eliminate the gap GP, the vicinity of the opening of the container 2 may formed in a mortar shape. However, because a special shape of the container 2 is required, the manufacturing cost of the container 2 is increased.

Also, even when such a container 2 is manufactured, because the distance L2 from the separation instrument 3A to the solution 4 is long, the momentum of the gas blown into the container 2 is greatly reduced before reaching the solution 4.

When the separation instrument 3A of Comparative Example 1 and the separation instrument 3 according to the present embodiment were used under the same conditions, the concentration time of the solution 4 was about 200 minutes for the separation instrument 3A and about 39 minutes for the separation instrument 3. That is, it was confirmed that the concentration time of the solution 4 can be reduced to one-fifth by the separation instrument 3 according to the present embodiment.

In the case of FIG. 7, the above-described problem can be solved when the opening of the container has a shape that expands in diameter upwardly, and the side surface of the separation instrument 3A and the opening of the container are in close contact with each other except at the groove. However, as illustrated in Comparative Example 1 below, in the case of a single groove, the swirling flow is uneven, so the state of the liquid surface tends to be unstable.

As illustrated below, the number of grooves is preferably at least two or more.

EXAMPLE

Figure 8:
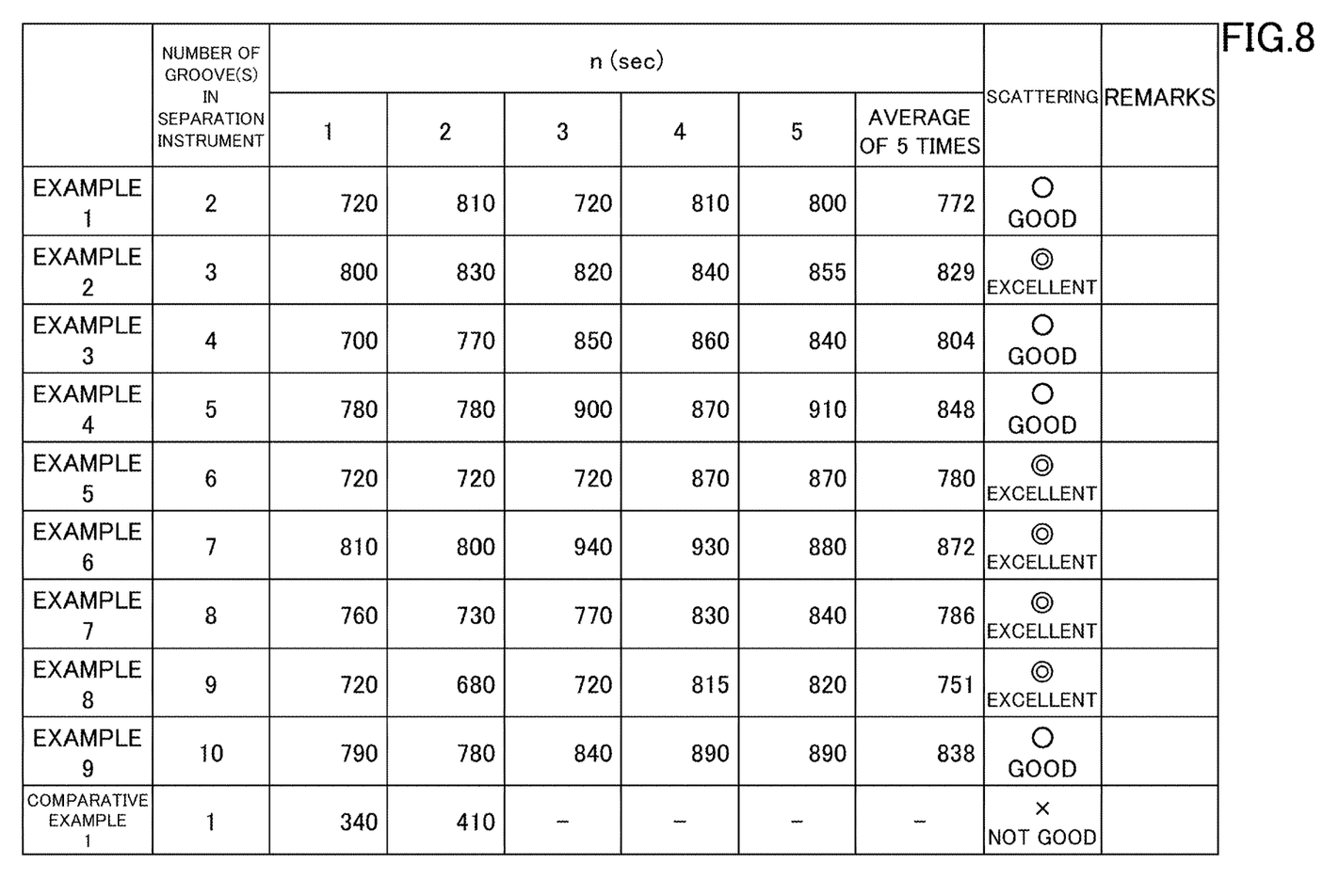
FIG. 8 is a table of Examples and Comparative Examples illustrating the relationship between the number of grooves of a separation instrument and the concentration time of a solution 4 at a same gas flow rate.

Hereinafter, the present invention will be described specifically with reference to examples. FIG. 8 illustrates the relationship between the number of grooves 3d and the concentration time of the solution 4 (concentration performance) when a conical tube is used as the container.

The conical tube has a tapered tip (the tip is rounded) as compared with the container illustrated in FIG. 1 and the like. The conical tube used in the experiment has a total length of about 170 mm, an inner diameter of about 14 mm, an inner diameter of about 5 mm on the tip side, and a tapered slope length of about 22 mm.

Examples 1 to 9 and Comparative Example 1 differed only in the number of grooves of the separation instrument, and used the same shape. Water was used as the liquid.

An inclination angle θ of the grooves 3d was about 20°, and the thickness and depth of the grooves 3d were designed so that the cross-sectional area of the entire grooves is 6.25 $mm^2$ even when the number of grooves was different. The length of the separation instrument 3 and the like is designed according to the type and amount of the liquid to be used.

The length (distance L1) from the separation instrument 3 to the solution 4 when standing still during the measurement of FIG. 8 was the same and was set to about 24 mm. The distance from the separation instrument 3 to the solution 4 varies depending on the type of the liquid, the size of the container, and the like. It is preferable that the distance does not exceed twice the inner diameter of the container, and more preferably, the distance is approximately the same as the inner diameter of the container. In the case of the conical tube, it was preferable that the distance was the inner diameter of the container (other than the conical part) or more.

Five measurements were performed under the same conditions, and the average value was determined.

The time n in FIG. 8 represents the time (sec) until 500 μl of tap water (solution) placed in a 14 ml conical tube dries up. More specifically, the separation instrument 3 having each number of grooves was placed in the conical tube, and the liquid surface was stirred by drawing with a vacuum pump, and the time required for the water to evaporate was measured.

In FIG. 8, the scattering was evaluated using the following criteria.

EXCELLENT: The liquid surface (the water surface) was at a position of 17 mm, and the solution was uniformly stirred without scattering.

GOOD: The liquid surface of the solution was at a position of 20 mm, and the solution was scattered to some extent, but did not reach the pipe.

NOT GOOD: The liquid surface was at a position of 24 mm, and the solution was violently scattered from the top of the separation instrument to the pipe, and the solution also adhered to the pipe (the remaining solution was less due to the scattering, which greatly reduced the concentration time).

From the above, it was confirmed that the gaseous substances can be efficiently separated and vaporized when the number of grooves is two or more. In addition, it was found that in a case where the number of grooves is 2 to 10, when the number of grooves is 2, 6, 8, or, concentration can be performed in a relatively short time.

Figure 9:
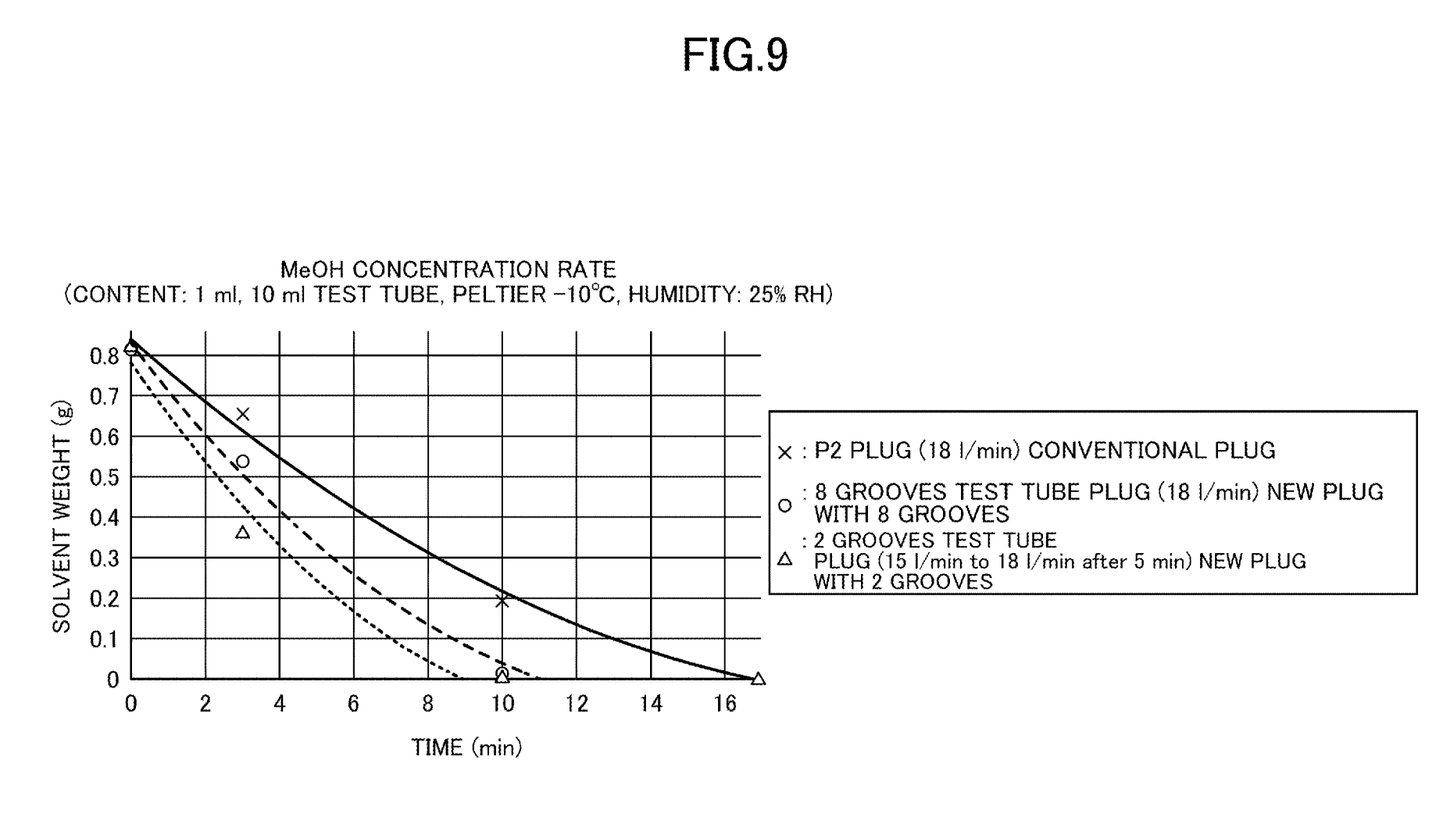
FIG. 9 is a graph of another embodiment illustrating the relationship between a gas flow rate, the number of grooves in a separation instrument, and the concentration time of the solution 4.

FIG. 9 compares the concentration rate of a methanol (MeOH) solution when there is one groove (prior art), to when there are two or eight grooves according to the present embodiment. All of the separation instruments have the same outer shape, and only the number of grooves is different. The P2 plug is a conventional separation instrument (plug) that also functions as a lid. The 8 grooves test tube and the 2 grooves test tube are the separation instruments (plugs) of the present embodiment, which have the same diameter and differ only in the number of grooves.

As a condition, the concentration rate was measured as follows. 1 ml of methanol (MeOH) with a concentration of 99.7% was placed in a 10 ml container and the gas (air) flow was 18 L/min.

As for the number of grooves being two, an example is illustrated in which the flow rate is set to 15 L/min at first and then to 18 L/min after 5 minutes.

The concentration rate was measured by measuring the volume of the tare with a precision scale every hour and measuring the weight. "Peltier −10° C." indicates the preset temperature when the vaporized methanol gas drawn into the vacuum pump is liquefied by the Peltier device, and was set to −10° C.

From FIG. 9, it can be seen that the separation instrument (plug) having a plurality of grooves according to the present embodiment significantly reduces the concentration time compared to a conventional single-grooved plug.

In the case of 2 grooves, it is indicated that, when the flow rate is initially 15 l/min and 18 l/min after 5 minutes, the concentration time can be substantially the same as for the plug with 8 grooves.

In this manner, by changing the flow rate from low to high, it is possible to efficiently perform concentration.

Next, a variation of the container 2 will be described with reference to FIGS. 10 and 11.

Figure 10:
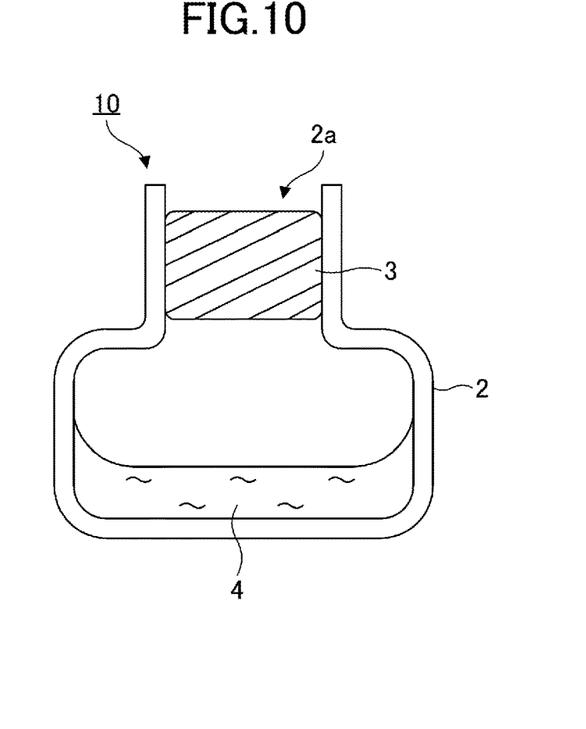
FIG. 10 is a diagram illustrating a first variation of a container 2.

FIG. 10 is a diagram illustrating a first variation of the container 2. As illustrated in FIG. 10, even when the separation instrument 3 is applied to the container 2 having a larger bottom cross-sectional area than the cross-sectional area of the opening 2a, the separation instrument 3 can be provided near the solution 4. By bringing the inner peripheral surface of the container 2 in the vicinity of the opening into contact with the entire side surface 3a of the separation instrument 3, the aforementioned effects can be obtained.

Figure 11:
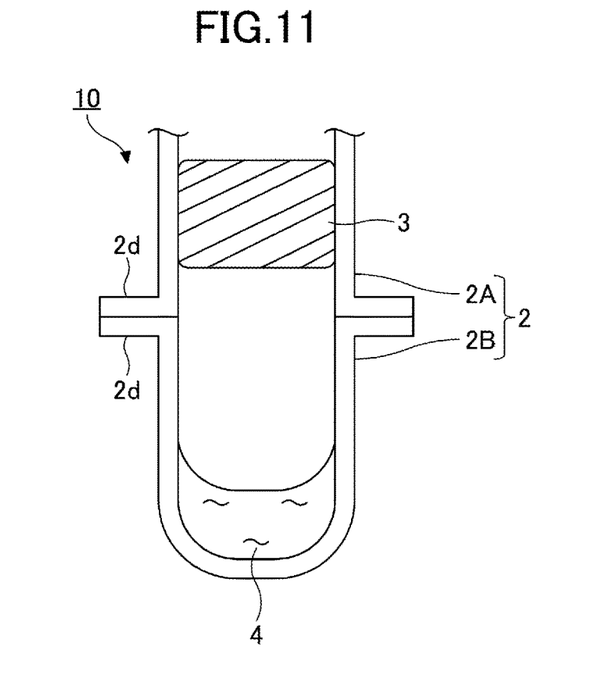
FIG. 11 is a diagram illustrating a second variation of the container 2.

FIG. 11 is a diagram illustrating a second variation of the container 2. The container 2 illustrated in FIG. 11 has a tubular member 2A and a bottomed member 2B that are vertically divided into two parts, and have shapes that can be connected to each other with respective flanges 2d. The container 2 is completed as follows. The tubular member 2A on the upper side is connected to the bottomed member 2B on the lower side in a state in which the tubular member 2A is provided with the separation instrument 3. Then, the respective flanges 2d are fixed to each other by a member such as a screw or a clip, for example. Even when the container 2 that can be divided into upper and lower parts is used in this manner, the separation instrument 3 may be provided near the solution 4. By bringing the inner peripheral surface of the tubular member 2A in contact with the entire side surface 3a of the separation instrument 3, the aforementioned effect can be obtained.

Figure 12:
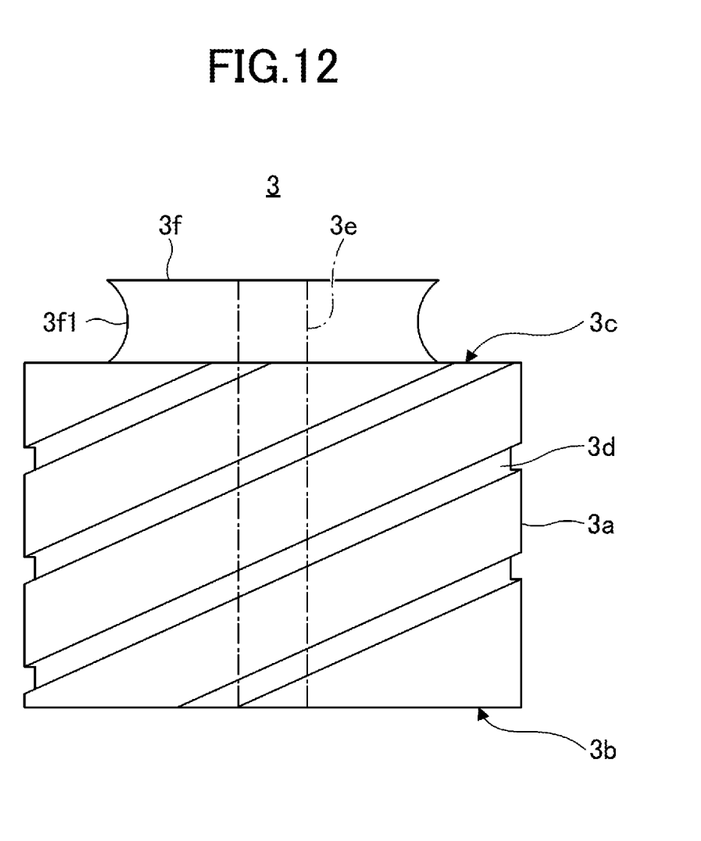
FIG. 12 is a diagram illustrating a variation of the separation instrument 3.

FIG. 12 is a diagram illustrating a variation of the separation instrument 3. The separation instrument 3 illustrated in FIG. 12 includes a mounting portion 3f to facilitate attachment and detachment of the separation instrument 3. The mounting portion 3f is a tubular member that can be grasped by a guide member (not illustrated). The guide member is a tool for inserting the separation instrument 3 into the container 2 or taking out the separation instrument 3 from the container 2 while gripping the mounting portion 3f of the separation instrument 3. For example, a recess 3f1, with which the gripping portion of the guide member is engaged, is formed on the outer peripheral portion of the mounting portion 3f. The configuration of the separation instrument 3 in this manner facilitates, among other things, removal of the separation instrument 3 from the inside of the container 2.

The structure illustrated in the above-described embodiment is an example of the contents of the present disclosure, and it may be combined with another known art, or part of the structure may be omitted or changed without departing from the gist of the present disclosure.

The present application claims priority to Japanese Patent Application No. 2020-178774, filed Oct. 26, 2020, with the Japanese Patent Office, the contents of which are incorporated herein by reference in their entirety.

DESCRIPTION OF THE REFERENCE NUMERAL

2 Container
2a Opening
2c Inner peripheral surface
3 Separation instrument
3a Side surface
3b Second end
3c First end
3d Grooves
3d1 Space
3e Through hole
4 Solution
4a Surface
10 Separation device
11 Depressurization section
100 Separation system
L1 Distance

The invention claimed is:

1. A separation device including a container and a separation instrument configured to separate a gaseous substance from a solution contained in the container, wherein
the separation instrument includes:
a first end;
a second end;
a side surface provided between the first end and the second end;
a plurality of gas introduction grooves configured to swirl a gas and introduce the gas into the container, the plurality of gas introduction grooves being formed on the side surface between the first end and the second end; and
a discharge hole configured to discharge the gaseous substance separated from the solution together with the gas, the discharge hole being formed between a center of the second end and a center of the first end, and
the side surface is configured to contact an inner peripheral surface of the container in a region between the first end and the second end, wherein an entire side surface except for the grooves is in contact with the inner peripheral surface of the container.

2. A separation system including the separation device of claim 1 and a depressurization section configured to depressurize the container.

3. A separation method performed by using the separation device of claim 1, the separation method comprising:
   providing, in the container, a solution in which a gaseous substance is dissolved; and
   swirling a gas, which is introduced between the container and a surface of the solution through the gas introduction grooves, along the inner peripheral surface of the container and blowing the gas onto the surface of the solution, thereby separating the gaseous substance from the solution and exhausting the gaseous substance separated from the solution together with the gas through the discharge hole.

4. The separation device according to claim 1, wherein a number of the gas introduction grooves is 2 to 10.

\* \* \* \* \*